Dec. 3, 1929.  W. R. McCORD  1,738,109
FOLDING STAKE OR UPRIGHT FOR TRUCKS, CARS, AND THE LIKE
Filed Nov. 8, 1928    2 Sheets-Sheet 1
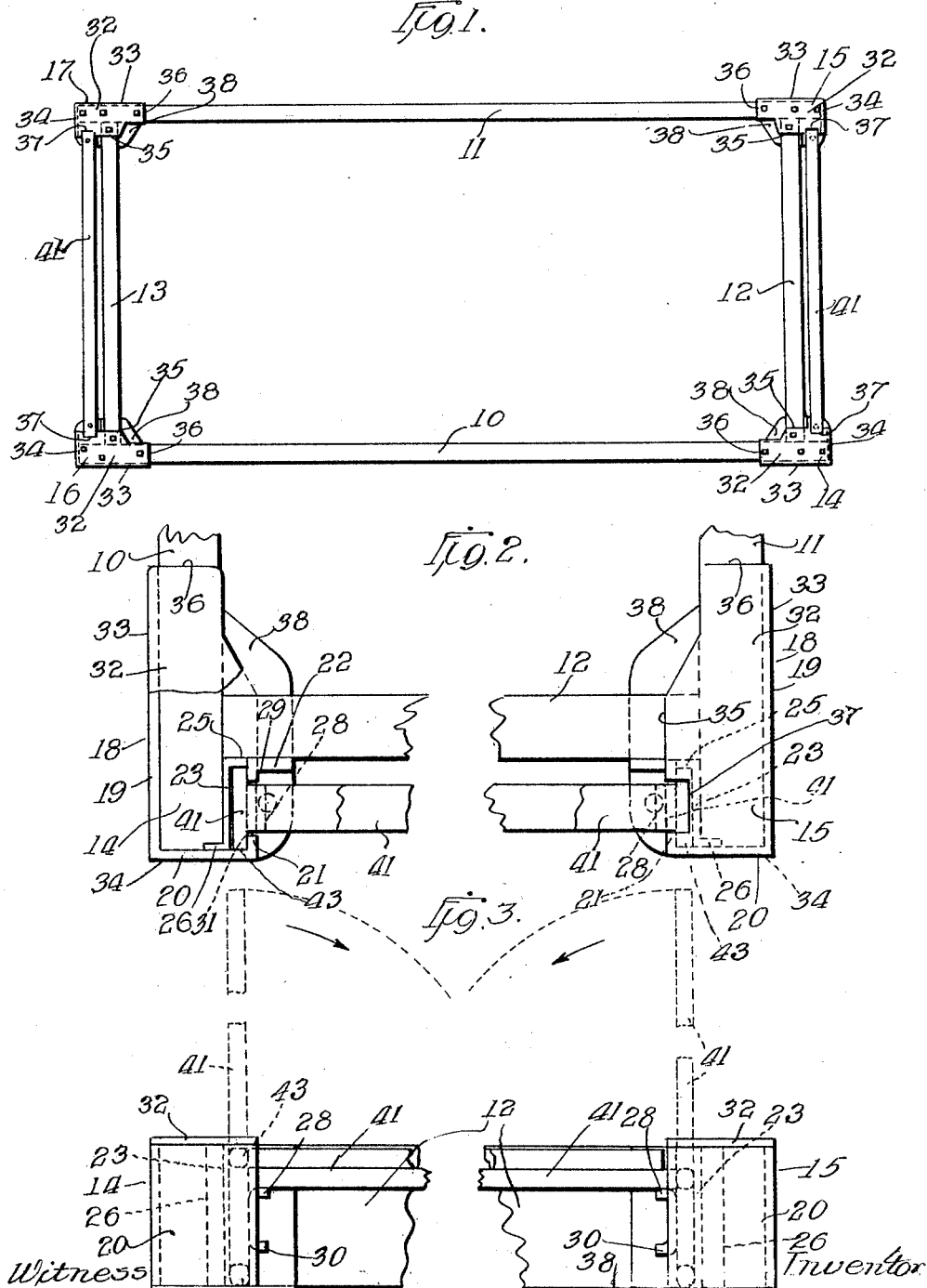
Witness
Harry R. L. White
Inventor
Washington R. McCord
By Harvey L. Hanson, Atty.

Dec. 3, 1929.  W. R. McCORD  1,738,109
FOLDING STAKE OR UPRIGHT FOR TRUCKS, CARS, AND THE LIKE
Filed Nov. 8, 1928  2 Sheets-Sheet 2
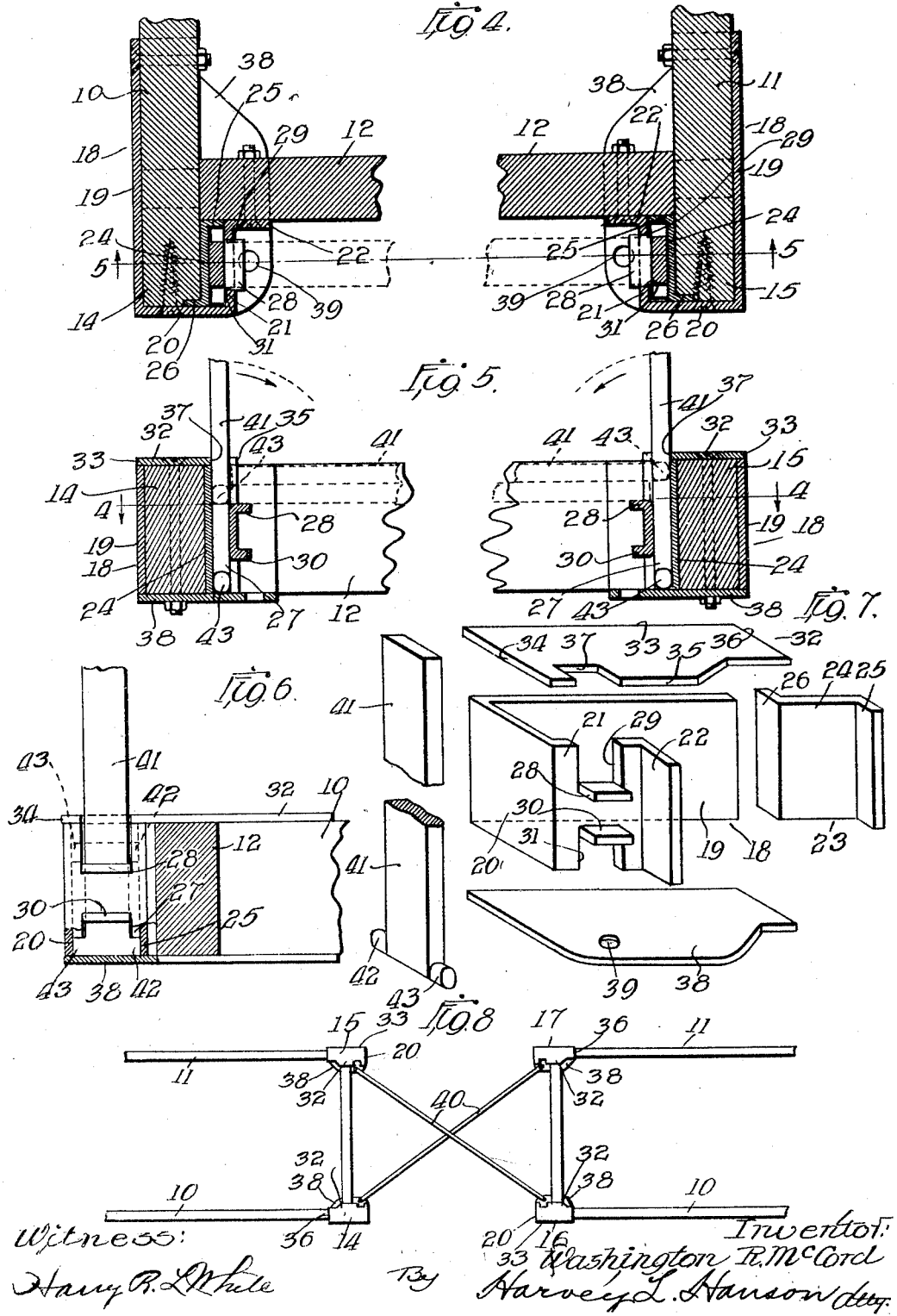

Patented Dec. 3, 1929

1,738,109

UNITED STATES PATENT OFFICE

WASHINGTON R. McCORD, OF BROOKFIELD, ILLINOIS

FOLDING STAKE OR UPRIGHT FOR TRUCKS, CARS, AND THE LIKE

Application filed November 8, 1928. Serial No. 317,964.

The invention relates to folding stakes or uprights, for trucks, cars and the like, and is particularly designed for use in connection with small platform trucks such as are extensively used in mail-order houses, railroad stations, and the like.

It is highly desirable to equip trucks of this character with folding stakes or uprights not only that they may be utilized to carry various types of loads, but also that they may be transported and stored in stacks which occupy a relatively small area when the trucks are not in use.

It is one of the objects of the invention to provide a structure which can easily be affixed to each of the four corners of the truck and which will materially strengthen the sill joints thereof.

A further object of the invention is to equip the trucks with folding or swinging stakes, and strengthening and supporting elements which may be readily and inexpensively manufactured and which are so constructed that similar parts may be interchanged one with the other, that is, left for right, or right for left. This interchangeability of parts is of prime importance in that fewer parts are necessary to be kept in stock for replacements and repairs, and because the parts may be readily and quickly assembled.

The invention also has for one of its objects the affixing of the holding stake structure to the inner faces of the longitudinal sills of the truck. This feature is also important in that it leaves the outer walls of the truck clear and unobstructed and thereby reduces the possibility of damage and breakage.

It is apparent that by reason of the particular construction embodied the stake pockets are actually part of the frame of the truck and for that reason, also, the possibility of damage and breakage is lessened.

Another object of the invention is to combine with the structure a base plate adapted to receive the cross connecting rods which are employed to join one truck with another. By this combination, the added strength given by the structure to the sill joints of the truck is utilized in combination with the connecting means to the next truck.

The invention also provides a construction wherein any of the stakes may be first swung into place. This results in a saving of time in folding and swinging the stakes into their horizontal positions, and also a saving in space.

The invention will be explained and more readily understood when read in conjunction with the accompanying drawings illustrating one embodiment of the invention, but it will be understood that various changes and modifications of which the invention is susceptible may be made without departing from the spirit of the appended claims forming a part hereof.

In the accompanying drawings:

Figure 1 is a plan view of the truck sills showing the stakes in their folded position.

Figure 2 is an enlarged plan view of one end of the truck showing in more detail the features of the invention.

Figure 3 is an end elevational view of the end of the truck shown in Figure 2 illustrating the stakes folded into their horizontal positions, and also illustrating by dotted lines their vertical positions.

Figure 4 is a horizontal sectional view taken on the line 4—4 of Figure 5.

Figure 5 is a vertical sectional view taken on the line 5—5 of Figure 4.

Figure 6 is a side view, partly in section and partly in elevation, of the inner end portion of the structure.

Figure 7 is a perspective view of the various elements of the invention showing them in a disassociated relation with each other, and Figure 8 is a plan view of the end portions of two adjoining trucks showing their manner of connection.

The structure of the invention comprises a truck body having longitudinal sills 10 and 11 and transverse sills 12 and 13. The ends of the longitudinal sills 10 and 11 extend beyond the transverse sills 12 and 13, forming extensions 14, 15, 16 and 17. The longitudinal sills 10 and 11 are joined to the transverse sills 12 and 13 by any suitable means.

In explaining the invention a description of the structure with reference to the longitudinal sill extension 14, will be made, it being understood, however, that the structure of the invention can be affixed to any one or more of the longitudinal sill extensions 14, 15, 16 and 17, as desired and as will hereinafter be more fully explained.

An irregularly shaped metallic plate, generally designated 18, is fitted against the outer and end portions of the longitudinal sill extension 14. The side wall portion 19 of the plate covers the entire depth of the longitudinal sill 10, and extends inwardly a suitable distance.

The wall portion 20 of the irregularly shaped plate 18 fits against the end of the extension 14, and extends inwardly, in the direction of the longitudinal sill extension 15, a short distance beyond the inner face of the extension 14.

Inner wall portion 21, integral with and a part of the irregularly shaped metallic plate 18, extends inwardly at right angles to the wall portion 20, and is parallel to the side wall portion 19. A flange 22 is bent inwardly from the wall portion 21 in the direction of the longitudinal extension 15, and rests against the transverse sill 12.

Because of the fact that the wall portion 20 of the irregularly shaped plate 18, extends inwardly beyond the inner face of the extension 14, it is apparent that an air space is left between the inner face of the longitudinal sill extension 14, and the wall portion 21.

A Z plate 23, having wall portion 24, 25 and 26, fits within the said air space, and forms a protection for the inner face of the extension 14. The main wall portion 24 of the plate 23 covers the entire inner face of the extension 14.

The wall portion 25 of the Z plate 23 is at right angles to the main wall portion 24, and rests against the transverse sill 12. The extremity of the wall or flange 25 abuts against the wall 21 of the irregularly shaped plate 18.

The other wall or flange 26 is also at right angles to the main wall portion 24 of the Z plate 23, but is at the other end thereof and projects from the wall 24 in a direction opposite to that of the wall or flange 25. A rabbet cut into the inner end portion of the extension 14, receives the wall or flange 26.

The air space between the wall 24 of the Z plate 23, and the wall 21 of the irregularly shaped outer plate 18 is the stake pocket 27 and is the receptacle for the stake, which will hereinafter be described.

A ledge 28 integral with the wall 21 projects from the wall 21, in the direction of the extension 15. This ledge is formed by cutting vertical slits in the wall 21, of the irregularly shaped plate 18 and bending downward the portion of the wall between the two slits, forming the ledge 28. It is obvious that by the formation of the ledge 28, an opening or aperture 29 is left in the upper portion of the wall 21.

A similar ledge 30 is formed below the ledge 28 in a corresponding manner. Vertical slits are cut in the lower portion of the wall 21, and the ledge 30 is formed by bending upward the portion of the wall lying between the two slits. An opening or aperture 31, corresponding to the opening or aperture 29, is thereby formed in the lower portion of the wall 21 of the plate 18.

An irregularly shaped top plate, generally designated 32, forms a cover plate for the extension 14, and the plates 18 and 23. The edge 33 of the top plate 32 is flush with the upper edge of the wall 19 of the plate 18. The edge 34 of the top plate is flush with the upper edge of the wall 20 of the plate 18.

The greater part of the edge 35 of the top plate is even with the upper edge of the wall 21 of the plate 18, but continues to run parallel to the longitudinal sill 10, until it reaches the inner face of the transverse sill 12, where it converges angularly and inwardly to the inner face of the longitudinal sill 10, and then resumes its direction parallel to the edge 33, along the inner face of the sill. The edge 36 is at right angles to the longitudinal sill, and parallel to the edge 34.

The top plate 32, has an aperture 37 cut into the edge 35, which registers with the aperture 29 in the wall 21 of the plate 18, and extends inwardly to the inner face of the extension 14.

A base plate 38 is provided which forms the lower portion of the structure, and which closes the lower end of the stake pocket 27. The outer and end edges of the base plate 38 are flush with the lower edges of the walls 19 and 20, respectively, of the plate 18. The inner end portion of the plate 38 projects inwardly beyond the wall 21 of the plate 18, toward the sill extension 15 and contains a circular hole 39 to receive the connecting rod 40 or other connecting means to the next truck.

A stake 41, which fits into the stake pocket 27, is provided with the transverse pivot extensions 42 and 43 at one end thereof and is constructed in any suitable manner known to the art. The transverse pivot extensions 42 and 43 project beyond each side of the stake 41.

The plates 18, 23, 32, and 38 are affixed to the extension 14 by any suitable means, but preferably in such a manner that the outer faces will be left clear and unobstructed, in order to reduce the possibility of damage and breakage.

The stake 41, when in its vertical position within the stake pocket 27 rests upon the base plate 38 and extends upwardly through the aperture 37 in the top plate. When in this position it is capable of resisting thrusts, whether they be inwardly or outwardly directed against the stake. The pivot extensions 42 and 43 of the stake 41, when in the aforesaid position, rest upon the base plate 38 and have their ends, which project transversely beyond the edges of the stake, in contact with and abutting the end walls of the stake pocket 27.

To fold or lower the stake 41 into its horizontal position, the stake is lifted vertically within the stake pocket 27 until the pivot extensions 42 and 43 of the stake are even with or above the ledge 28. The stake can then be lowered transversely of the truck, the said stake pivoting on the transverse extensions 42 and 43 of the stake, and passing through the aperture 29 in the wall 21 of plate 18. The outer extremity of the stake when in its folded or lowered position, rests upon a ledge on the extension 15 similar to the ledge 28 of the plate 18.

The top plate 32, secured to the extension 14 by suitable means, prevents the accidental removal of the stake 41 from the stake pocket 27. It is obvious that as the stake 41 is lifted vertically within the stake pocket 27, the transversely projecting pivot extensions 42 and 43 of the stake 41, strike the portion of the top plate 32 which lies adjacent the aperture 37, and thus prevent the stake from slipping out of the stake pocket. In order to replace a stake, the top plate 32 is removed, and a new stake is inserted within the pocket.

In order to raise the stake from its lowered or horizontal position into its vertical or operative position, the stake is lifted into a vertical position within the stake pocket 27 pivoting on the transverse pivot extensions 42 and 43 of the stake 41, and is then dropped to the base of the stake pocket, where it is ready to be used in supporting the truck load.

It is to be noted that the various plates and the stake may be used on any of the longitudinal sill extensions 14, 15, 16, or 17. In order to use the plate 18 on extension 15, all that is necessary is to invert the plate, and it is ready to be used on the said extension. In other words, by simply turning the plate 18 upside down, the plate is adapted for use on the extension 15.

It can readily be seen that by an inversion of the plates 23, 32, and 38, they too, are adapted for use on extension 15. In this simple manner any of the plates may be used on any of the extensions.

This interchangeability of parts results in economy of operation, for it means that fewer parts are necessary to be kept in stock for replacements and repairs, and that when assembling the parts and constructing the truck using the invention the liability of error is lessened to a very great degree.

It is also to be observed that the structure of the invention permits of the folding or lowering of any stake into its horizontal position in the first instance. In other words, the parts of the invention are so constructed and arranged that the stake 41 in the stake pocket 27 on the extension 14 or the stake in the stake pocket of the extension 15, may be first folded or lowered into place.

The stake which is last folded or lowered into place instead of resting upon the ledge 28, or the ledge 30 of the inverted plate, as the case may be, rests upon and is supported by the folded or lowered stake. These features of being able to fold or lower either stake at will, and to superpose either stake over the other results in a great saving of time in folding or lowering the stakes into their horizontal position, and it also results in a saving of space.

By combining with the structure a means to affix the cross connecting rods 40 which are employed to join one truck with another, the added strength given by the structure to the sill joints of the truck is utilized in combination with the connecting means to the next truck.

Having described the invention, what I claim and desire to secure by Letters Patent is:

1. In a stake pocket for trucks, cars and the like having a longitudinally extending side sill, an invertible irregular plate attached to the end of said side sill and consisting of a flange attached to the outer portion of said sill, a transversely extending portion across the end of said sill and an inwardly bent portion parallel to said first mentioned flange and spaced from said sill, said inwardly bent portion having an offset flange, and horizontal ledges struck out from said inwardly bent portion to provide a support for a stake in either of the two positions of the invertible irregular plate.

2. In a folding stake and support for trucks, cars, and the like, the combination of longitudinal and transverse sills, said longitudinal sills extending beyond said transverse sills, an irregularly shaped metallic plate encasing one of said longitudinal sill extensions, said plate with said extension forming a stake pocket, a stake arranged to slide vertically within the said stake pocket, a top plate covering the said longitudinal extension, said top plate preventing the removal of the stake from the stake pocket, a base plate, a Z plate within said stake pocket adjacent the longitudinal sill extension, a bent portion or ledge formed in said irregularly shaped metallic plate, said stake being adapted to swing transversely of the longitudinal sills and rest on said ledge, another bent portion or ledge formed in said irregularly shaped metallic plate adapted to support a stake in lowered position in the event of inversion of said irregularly shaped metallic plate.

3. In a folding stake and support for trucks, cars, and the like, the combination of longitudinal and transverse sills, said longitudinal sills extending beyond said transverse sills, an irregularly shaped metallic plate encasing one of said longitudinal sill extensions, said plate with said extension, forming a stake pocket, a stake arranged to slide vertically within the said stake pocket, a top plate covering the said longitudinal extension, said top plate preventing the removal of the stake from the stake pocket, a base plate, a Z plate within said stake pocket adjacent the longitudinal sill extension, a bent portion or ledge formed in said irregularly shaped metallic plate, said stake being adapted to swing transversely of the longitudinal sills and rest on said ledge, another bent portion or ledge formed in said irregularly shaped metallic plate adapted to support a stake in lowered position in the event of inversion of said irregularly shaped metallic plate, the last mentioned ledge being beneath the first mentioned ledge in order that when said irregularly shaped metallic plate is inverted said last mentioned ledge may act as a support for said stake.

In witness whereof, I hereunto subscribe my name this fifth day of November A. D., 1928.

WASHINGTON R. McCORD.